INVENTOR.
RAY E. FORPAHL

July 28, 1970  R. E. FORPAHL  3,521,719

MOTOR VEHICLE

Filed Oct. 3, 1966  4 Sheets-Sheet 5

INVENTOR.
RAY E. FORPAHL
BY *Ronald W. Mayes*

July 28, 1970     R. E. FORPAHL     3,521,719
MOTOR VEHICLE

Filed Oct. 3, 1966     4 Sheets-Sheet 4

INVENTOR.
RAY E. FORPAHL
BY Ronald W. Mayer

United States Patent Office 3,521,719
Patented July 28, 1970

3,521,719
MOTOR VEHICLE
Ray E. Forpahl, Harper, Kans., assignor to Rhino
Industries, Inc., Kingfisher, Okla., a corporation of
Oklahoma
Filed Oct. 3, 1966, Ser. No. 589,772
Int. Cl. B60k 15/00
U.S. Cl. 180—51    25 Claims

ABSTRACT OF THE DISCLOSURE

This very compact articulated four-wheel drive motor vehicle has a rear chassis carrying an engine and an hydraulic pump for driving an hydraulic motor and a transmission that drives all four wheels carried on a front chassis. An operator's seat and steering apparatus are mounted on the front chassis preferably along with a material handling apparatus.

BACKGROUND OF THE INVENTION

This invention relates to motor vehicles. More particularly, this invention relates to articulated motor vehicles.

One of the problems encountered in the motor vehicle art is the provision of motor vehicles for use in close quarters especially for material handling purposes. Many vehicles cannot turn or maneuver in relatively close quarters because the steerable wheels are located at one end of the vehicle and not in or near the center of the vehicle.

Another problem encountered is that the vehicles themselves are so large as to further complicate the maneuverability problem.

A still further problem encountered in the many high lift type material handling motor vehicles is the fact that the clearance between the frame and the road surface is so low that the vehicles are restricted to operation upon hard surfaces only and not in close quarters particularly where no prepared road surface is available.

SUMMARY OF THE INVENTION

It is therefore an object of this invention to provide a novel articulated motor vehicle that is short, compact, easily and economically manufactured, has high road clearance between the frame and road surface, and/or which can be easily maneuvered in a very small space because the turning of the vehicle is controlled at a midportion and not at the wheels thereof.

Another object of this invention is the provision of a novel articulated motor vehicle in which the front and rear axles are driven by but one fluid motor located near one of the axles.

A still further object of this invention is the provision of a novel articulated motor vehicle that has relatively high road clearance between the frame and the ground for permitting the same to be operated on relatively rough or unprepared terrain or in close and cramped quarters that ordinarily would not accommodate a self-propelled material handling apparatus.

Yet another object of this invention is the provision of a novel vehicle propulsion system comprising front and rear axles having differentials driven by an hydraulic motor via a transmission, the motor being supplied with hydraulic fluid under pressure by a pump driven by an internal combustion engine.

A still further object of this invention is the provision of a novel motor vehicle comprising front and rear frame members coupled together in such a manner as to permit the two frame members to be pivoted relative to each other about a central longitudinally extending axis and about a central vertical pivot axis between the two frame members, the vertical and longitudinal axes being coplanar, and wherein the rear frame member supports a prime mover portion of a propulsion system for the vehicle and the front frame member supports a motor for driving the wheels and is a work load carrying surface suitable for having a material handling apparatus mounted thereon.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
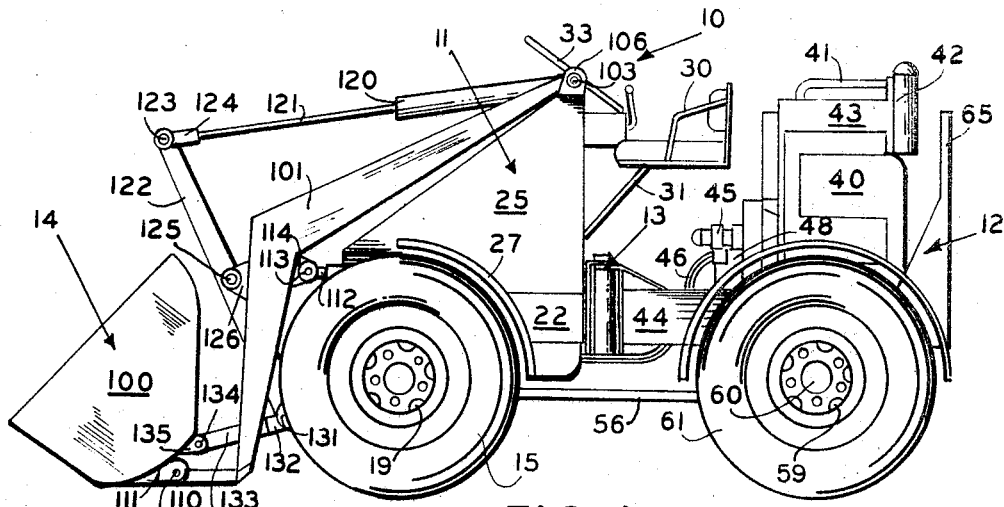
FIG. 1 is a side elevational view of an articulated motor vehicle embodying the invention.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

A vehicle embodying the invention is indicated generally by the reference numeral 10. The vehicle 10 comprises a front chassis indicated generally by the reference numeral 11 and a rear chassis indicated generally by the reference numeral 12. The front chassis 11 and the rear chassis 12 are pivotally connected together in an articulate manner by a coupling indicated generally by the reference numeral 13. The front chassis 11 has mounted thereon a material handling apparatus indicated generally by the reference numeral 14.

Figure 2:
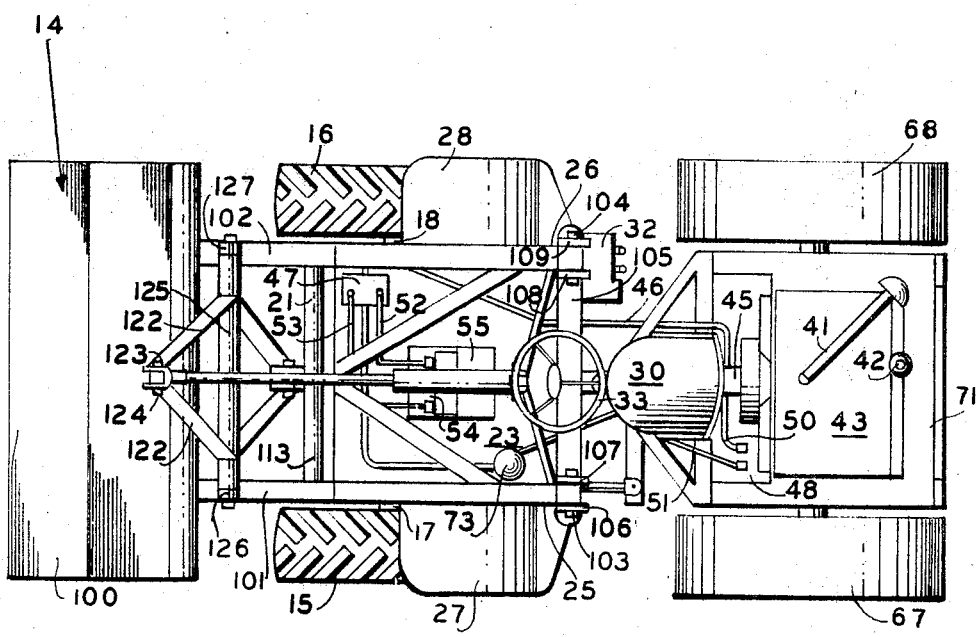
FIG. 2 is a top plan view of the vehicle of FIG. 1.

More particularly, the front chassis 11 is supported by a left front wheel 15 and a right front wheel 16. An axle 17 drives the wheel 15. An axle 18 drives the wheel 16. Hydraulic brake assemblies 19 are mounted on each of the wheels 15 and 16. A differential 20 drives the axles 17 and 18. The chassis 11 further comprises a front frame member 21 rigidly fixed to the axles 17 and 18. The front frame member 21 has a box frame 22 comprising a rectangular configuration made up of channel members of U-shaped cross-sectional configuration. A sheet metal member 23 forming a floor for the front frame member 21 is of rectangular configuration and is formed with a rectangular cutout in a central portion thereof. As best seen in FIG. 2 the frame member 21 has a metal side panel member 25 of trapezoidal shape mounted on the left side thereof, and on the right side thereof has a similarly shaped side panel member 26 mounted thereon. The frame 21 supports a left front fender 27 of arcuate configuration subtending an angle of approximately 90°.

A similarly shaped fender 28 is secured to the right side of frame 21 as seen in FIG. 2.

A driver's seat 30 is resiliently supported on an obliquely and upwardly extending leaf spring member 31 of generally S-shaped configuration at an upper end thereof. The lower end of the spring member 31 is rigidly secured to the front frame member 21 in a conventional manner.

Figures 7, 8:
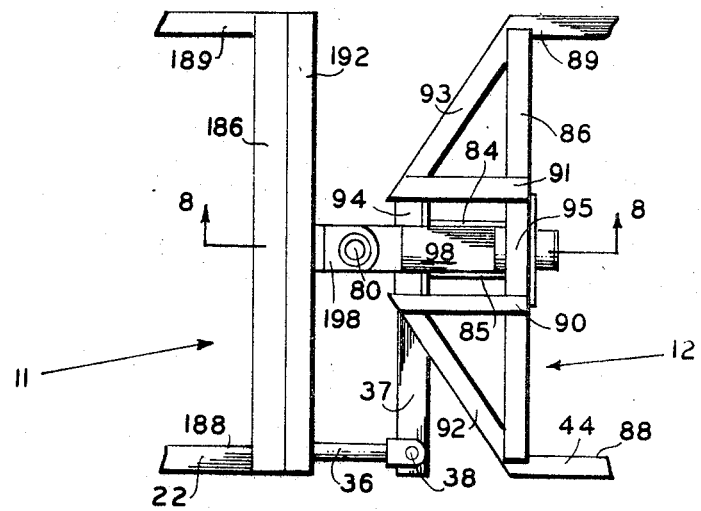
FIG. 7 is a top plan view of the coupling of FIG. 6.
FIG. 8 is an enlarged cross-sectional view of the coupling along section line 8—8 of FIG. 7.

A control panel 32 is fixed to the upper right hand side of the front chassis 11 and more particularly is fixed to the side member 26 in a convenient location adjacent a steering wheel 33. The steering wheel 33 is connected to a control valve, not shown, at a lower end thereof for operating a double acting fluid motor 35, as best seen in FIG. 7. The fluid motor 35 has a connecting rod 36 pivotally connected at an outer end thereof to a rigid laterally extending steering lever member 37 by means of a pivot pin 38. The lever member 37 is fixed to a forward end of the rear chassis 12 in a manner to be described. The cylinder of the double acting fluid motor 35 is preferably pivotally connected in a conventional manner to a housing of the left front axle 17 by a pivot pin 39, FIG. 3. Alternatively, the cylinder of the fluid motor 35 may be pivotally connected to the underside of the front frame member 21, if so desired.

The rear chassis 12 comprises an internal combustion engine 40 which forms a basic prime mover or power means for propelling the vehicle 10. Preferably the engine 40 is a gasoline engine. The engine 40 has an exhaust pipe 41 and an air intake device 42. A hood 43 protects the engine 40 from the elements in a conventional manner. The chassis 12 further comprises a rear frame member 44 on which is mounted the engine 40.

The engine 40 drives a pump 45. More particularly the pump 45 is preferably a single stage pump that discharges hydraulic fluid under pressure through a discharge line 46 to a reversing valve 47. The pump 45 draws fluid from an hydraulic fluid supply tank 48 via an intake line 50. Spent fluid is returned to the tank via a return line 51 from the valve 47. Fluid pressure distribution lines 52 and 53 connect the valve 47 to an hydraulic motor 54. It is to be understood that the valve 47 can be controlled so that the hydraulic motor 54 can be driven in one direction by using the distribution line 53 as a return line and the line 52 as a pressure fluid line. By putting the valve 47 into reverse, the hydraulic motor 54 is put in reverse drive. Accordingly, the line 52 becomes a return line and the line 53 becomes a pressure fluid line to the hydraulic motor 54.

The hydraulic motor 54 is drivingly connected to a transmission 55. Preferably the transmission 55 is a two-speed transmission that provides a power takeoff for a drive shaft 56. The drive shaft 56 drives a rear differential 58, a left wheel drive axle 60, and a right wheel drive axle 62. The left axle 60 drives a left rear wheel 61. The right axle 62 drives a right rear wheel 63, FIG. 5. Hydraulic brake assemblies 59 are mounted on each of the wheels 60 and 61.

Figure 5:
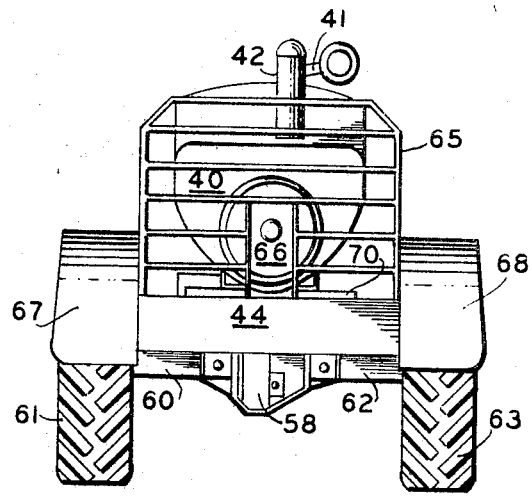
FIG. 5 is a rear end view of the vehicle of FIG. 1.
Figure 6:
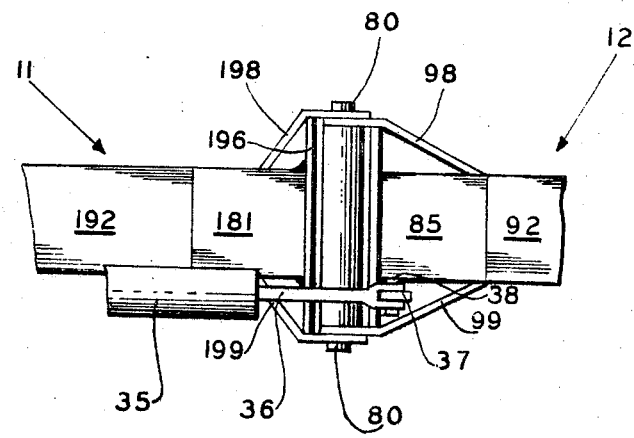
FIG. 6 is an enlarged view of the articulated coupling located at the center of the vehicle of FIG. 1.

A trailing edge of the frame 44 is provided with a grill work 65 for the purpose of protecting the engine 40 as well as the engine cooling fan 66, FIG. 5. It will be noted that the fan 66 not only cools the engine, but also operates to cool the hydraulic fluid supply tank 48. If desired, the tank 48 can be provided with conventional cooling fins and/or ducts. The grill 65 may be of any conventional configuration or design. However, the grill preferably comprises a grid of horizontal parallel bars and is of substantially rectangular configuration.

Two semi-circular fenders 67 and 68 are fixed to the rear frame member 44 for covering the rear wheels 61 and 63 in a conventional manner. Preferably the engine 40 is resiliently mounted by means of conventional rubber pads on a large rectangular metal pad 70, FIG. 5. Preferably the floor of the rear frame member 44 comprises a sheet metal member 71 of rectangular configuration similar to the floor member 23 of the front frame member 21. The floor member 71 corresponds to the shape of the frame member 44.

Figure 3:
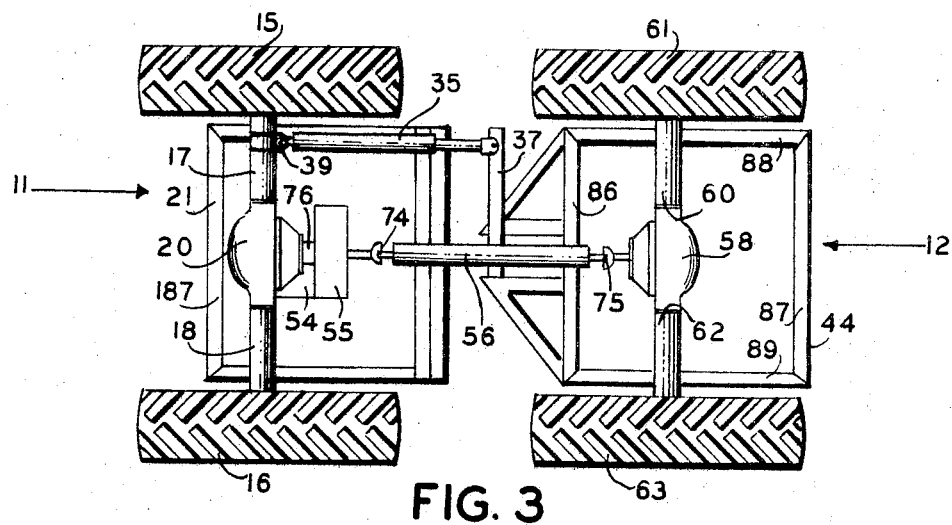
FIG. 3 is a bottom view of the vehicle of FIG. 1, but with a material handling apparatus and other parts removed for showing details of the propulsion system.
Figure 4:
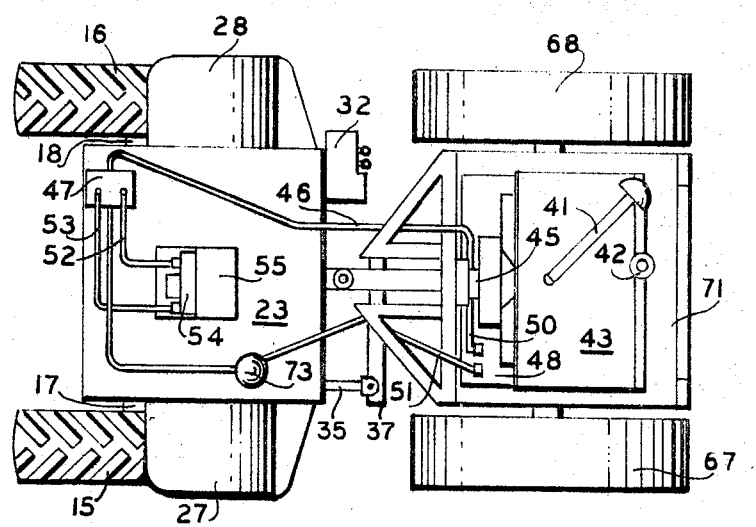
FIG. 4 is a view similar to FIG. 2 but with certain parts broken away for showing additional details of the propulsion system.

As best seen in FIGS. 1 through 4, the internal combustion engine 40 drives the pump 45 which discharges through a discharge line 46 to the reversing valve 47. The valve 47 discharges through lines 52 and 53 depending upon which way the hydraulic motor 54 is being driven. Additionally, the valve 47 can be positioned as to place the hydraulic motor 54 in neutral. Expended fluid from the fluid motor 54 is returned to the tank 48 via the return line 51. Preferably the return line 51 has a conventional filter 73 therein for filtering clean the hydraulic fluid that is being returned to the tank 48 and then recirculated throughout the system. The hydraulic motor 54 drives the transmission 55 which in turn drives the rear wheels 61 and 63 via the drive shaft 56, the rear differential 58, and the rear axles 60 and 62, respectively. The drive shaft 56 has universal joints 74 and 75 therein preferably interposed at the front and rear ends of the drive shaft 56, FIG. 3. As best seen in FIG. 3 the front wheels 15 and 16 are driven via a drive shaft 76, the differential 20, the axles 17 and 18, respectively. It will be understood that the front and rear chassis do not turn relative to the two pairs of wheels 15, 16, and 61, 63, but turn only through the coupling 13.

The coupling 13 is preferably of an all welded construction. As seen in FIGS. 4, 6, 7, and 8, the coupling comprises a vertically extending trunnion, pintle, or king pin 80 that operates to define a vertical turning axis. An horizontal turning axis is defined by a trunnion member 81, FIG. 8, that is journaled at either end thereof in plain journal bearings 82 and 83. The bearings 82 and 83 preferably have conventional grease channels for purposes of lubricating the same. The bearings 82 and 83 are concentrically disposed in and fixed to plate-like members 84 and 85.

The rear frame member 44 comprises a channel-shaped front cross member 86, rear cross member 87, and opposed side members 88 and 89. A short frame comprises a pair of parallel, longitudinally extending members 90 and 91 also of U-shaped or channel-shaped cross-section. The members 90 and 91 are laterally disposed on either side of the upper and lower members 84 and 85. Diagonal members 92, 93 at the outer ends thereof are respectively connected to the side member 88 and the side member 89. The inner ends of the diagonal members 92 and 93 are respectively fixed to the forward ends of the members 90 and 91. Parallel box-shaped horizontal trunnion bearing support beams 94 and 95 extend transversely between the members 90 and 91 and are fixed thereto. The bearings 82 and 83 are disposed respectively in circular openings formed in the beams 94 and 95. Each of the beams 94 and 95 are channel beams having a plate welded across the legs thereof for extending the length of and enclosing the same to provide a box-shaped cross-sectional configuration to the beams 94 and 95, FIGS. 6, 7, and 8.

A leading end portion of the horizontal trunnion 81 is fixed to a rear vertical plate 96 of rectangular configuration, a trailing end of the horizontal trunnion 81 is fixed to a circular thrust plate 97 for securing the trunnion 81 in place in the bearings 82 and 83, and therefore in the rear frame member 44.

Upper and lower rear arm members 98 and 99 respectively have leading edge portions thereof fixed to the upper and lower ends of the rear vertical plate 96. The upper and lower rear arm members 98 and 99 respectively have trailing edges thereof fixed to the horizontal trunnion 81 between the bearings 82 and 83. The leading ends of the members 98 and 99 are parallelly disposed to each other and have coaxial circular openings formed therein for receiving the pin 80 therethrough.

The front chassis 11 having the front frame member 21 is constructed similarly to the rear chassis 12 but is not provided with the horizontal trunnion arrangement described hereinabove. The box frame 22 comprises rear and front channel-shaped members 186 and 187 and channel-shaped side members 188 and 189. An additional channel member 192 is fixed to the rear member 186 for reinforcing the same. A longitudinally extending tow bar 193 of box-shaped cross-section is fixed at a leading end thereof to a midportion of the member 192. The rear end of the tow bar 193 is fixed to a vertical plate 196. The tow bar 193 is short and permits the rear chassis 12 to be moved closer to the front chassis 11. This in turn permits the scoop 100 to be moved closer to the wheels 15, 16 of the front chassis 11. Accordingly, the overall length of the vehicle 10 is shortened for better operation in close quarters.

Upper and lower front arm members 198 and 199 are fixed at the forward ends thereof to the upper and lower sides of the tow bar 193. The trailing ends of the arm members 198 and 199 are parallelly disposed to each other and are formed with coaxial circular openings for receiving the king pin 80 therethrough and sandwiching the arm members 98 and 99 therebetween. The king pin 80 is of the same length as the trunnion 81 and is located midway between the front axles 17, 18 and the rear axles 60, 62.

The material handling apparatus 14 comprises a scoop member 100 for hoisting material upwardly through a plane defining arc. A pair of parallel arm members 101 and 102 are pivotally connected at the rear ends thereof by pivot pins 103 and 104, respectively, FIG. 2. The pins 103 and 104 are located in a vertical plane disposed closely adjacent the king pin 80 for distributing the load of the scoop 100 as evenly as possible on both the front chassis 11 and the rear chassis 12 of the vehicle 10. The arm members 101 and 102 form the chief lifting and support means for the scoop 100.

The front frame member 21 is provided at a trailing edge thereof with a transversely disposed upper horizontal support member 105. The member 105 supports a pair of upstanding parallel ears 106, 107 for an arm pivot pin 103, and a pair of upstanding parallel ears 108 and 109 for an arm pivot pin 104. The forward end of the arm 101 is pivotally connected by a pin 110 between rearwardly extending and vertically disposed parallel support flanges 111. The flanges 111 are fixed to the backside of the scoop 100. The forward end of the arm 102 is similarly connected to the material handling scoop 100.

The arms 101 and 102 are respectively simultaneously elevated or lowered by extending or retracting two parallelly disposed and forwardly extending double acting fluid motors. Only the left hand fluid motor 112 is shown and described since both motors are similarly arranged and connected. The fluid motor 112 is pivotally connected by a pin 113 between parallel lugs 114 at an underarm bight portion of the arm 101, the arm 101 is substantially S-shaped. The arm 102 is of a similar configuration and is similarly connected to a double acting fluid motor, such as described for the arm 101. The extension and retraction of the twin fluid motors for elevating and lowering the arms 101 and 102 together is assured by a transverse member carrying the pivot pin 113 extending between and rigidly connected to the two arms 101 and 102, FIG. 2. By extending the fluid motor 112 the arms 101 and 102 are lifted which, in turn, lifts the scoop 100 in an arc defining a substantially vertical plane.

In order to tilt the scoop 100 forwardly for scooping up a load of material or for tilting the scoop 100 upwardly for securing a load, as shown in FIG. 1, a double acting fluid motor 120 is respectively retracted and extended. The motor 120 has a piston rod 121 pivotally connected to a rocker arm 122 by means of a pivot pin 123. The outer end of the piston rod 121 is provided with a clevis 124 for supporting the pivot pin 123, as seen in FIGS. 1 and 2. The rocker arm 122 has a generally parallelogram or diamond configuration comprising four straps or bars that are all secured to a central transversely extending horizontal member 125. The member 125 is pivotally connected at the outer ends thereof to a lug 126 on the arm 101 and a lug 127 fixed to the arm 102. The lower end of the rocker arm 122 is provided with a pivot pin 131 for securing the rocker arm 122 to a clevis 132 fixed to the outer end of a scoop tilt push-pull rod 133. The push-pull rod 133, at an inner end thereof, is pivotally connected by a pivot pin 134 to a pair of support lugs 135 fixed to the backside of the scoop 100 between the arms 101 and 102. When the scoop tilt fluid motor 120 is retracted, as best seen in FIG. 1, the rocker arm 122 rotates in a clockwise direction about the pivot pin member 125. Accordingly, the rocker arm 122 tilts the scoop 100 in a counterclockwise direction relative to the arms 101 and 102.

From the foregoing description of this novel motor vehicle, it is clear that the vehicle has a short or sharp turning radius and high ground or road clearance for operation on rough or unpaved terrain, such as grain bins or storage quarters of fine particulated contiguous particles. The vehicle is provided with four-wheel drive in a forward or a reverse direction and can be maneuvered into and out of corners of buildings or other enclosures.

Moreover, the front chassis of the vehicle is in clear view of the operator and is free to have mounted thereon any of a large array of material handling apparatuses known to the art.

It will be understood that this invention can be modified to adapt it to various circumstances and conditions, and it is accordingly desired to comprehend within the purview of this invention such modifications as may be considered to fall within the scope of the appended claims.

What is claimed is:

1. A motor vehicle comprising, in combination, first frame means, second frame means pivotally connected to said first frame means, an engine mounted on said second frame means, first wheel means supporting said first frame means, second wheel means supporting said second frame means, transmission means carried by said first frame means, pump means driven by said engine and mounted on said second frame means, motor means driven by fluid from said pump means and mounted on said first frame means, said motor means connected to and driving said transmission means, first differential means and first axle means connected to said first wheel means and driving the same, second differential means and second axle means connected to said second wheel means and driving the same, first drive shaft means drivingly connecting said first differential means to said transmission means, and second drive shaft means pivotally connecting said second differential means to said transmission means.

2. A motor vehicle as set forth in claim 1, further comprising, valve means mounted on said first frame means and connected to said motor means for reversing the flow of fluid therein for controlling and reversing the drive of said motor means for permitting the vehicle to be propelled in a forward direction and in a reverse direction, and fluid supply tank means mounted on said second frame means and connected to said pump means and said valve means.

3. A motor vehicle as set forth in claim 1, further comprising, valve means connected to said motor means for reversing the flow of fluid therein for controlling and reversing the drive thereof for permitting the vehicle to be propelled in a forward direction and in a reverse direction.

4. A motor vehicle as set forth in claim 1, wherein said second drive shaft means connected to said transmission means has universal joint means therein.

5. A motor vehicle as set forth in claim 4, further comprising, coupling means pivotally connecting said first frame means and said second frame means together, and double acting fluid motor means pivotally connected to said first and second frame means for steering the vehicle by the selective extension and retraction of said fluid motor means.

6. A motor vehicle as set forth in claim 1, wherein said transmission means is a two-speed transmission.

7. A motor vehicle as set forth in claim 1, wherein said pump means is a single stage pump driven by said engine.

8. A motor vehicle as set forth in claim 1, further comprising manually operated steering means mounted on said first frame means, and operator seat means carried by said first frame means.

9. A motor vehicle comprising, in combination, first frame means, second frame means connected to said first frame means for movement about both a vertical axis and an horizontal axis extending longitudinally of the vehicle, an engine mounted on said second frame means, a first pair of laterally disposed wheels supporting said first frame means, a second pair of laterally disposed wheels supporting said second frame means, fluid motor and transmission means driven by said engine and carried by said first frame means drivingly connected to said first pair of wheels, and said driven means drivingly and universally pivotally connected to said second pair of wheels to accommodate pivoting of the vehicle about said vertical axis and said horizontal axis.

10. A motor vehicle as set forth in claim 9, further comprising, a vertically movable material handling device and operator seat means mounted on said first frame means, and said driven means being disposed beneath said frame means.

11. A hydraulically driven articulated vehicle comprising, a front chassis, said front chassis having an horizontally disposed front frame member, front axle means rigidly connected to a forward portion of said front frame member, front differential means drivingly connected to said front axle means, front two-speed transmission means drivingly connected to said front differential means, an hydraulic motor drivingly connected to said front transmission means, front wheel means mounted on end portions of said front axle means, hydraulic brake means connected to said front wheel means, a four-way hydraulic control valve mounted on said forward portion of said front chassis, a rear chassis, coupling means connecting said front chassis to said rear chassis in an articulated manner, said rear chassis having an horizontally disposed rear frame member turnably connected to said horizontally disposed front frame member by said coupling means in such a manner as to permit said rear chassis to laterally tilt about a central axis extending longitudinally of said chassis through said coupling means and to swing about a central axis extending perpendicular to said longitudinal axis through said coupling means, rear axle means rigidly connected to said rear frame member, rear wheel means mounted on said rear axle means, rear hydraulic brake means connected to said rear wheel means, rear differential means drivingly connected to said rear axle means, rear drive shaft means drivingly connected at one end thereof to said rear differential means and at the other end thereof drivingly and pivotally connected to said front transmission means, an internal combustion engine mounted on said rear frame member, a supply tank for hydraulic fluid, a single stage hydraulic pump driven by said engine and mounted on said rear chassis above said supply tank, a cooling fan driven by said engine for cooling said engine and said supply tank, a pump intake line connecting said supply tank to said hydraulic pump, pump discharge line connecting said hydraulic pump to said four-way valve, a return line connecting said four-way valve to said supply tank, a filter in said return line, a first fluid pressure distribution line connecting said four-way valve to said hydraulic motor at an inlet thereof, a second fluid pressure distribution line connecting said hydraulic motor at an outlet thereof to said four-way valve, said four-way valve being constructed and adapted to pass hydraulic fluid under pressure through said hydraulic motor and said distribution lines in a forward direction and in a reverse direction in such a manner as to propel the vehicle in a forward and a reverse direction, manually operated means for controlling said four-way valve connected to said front chassis, fluid motor means pivotally connected to said front axle means at one end thereof and pivotally connected at the other end thereof to said rear frame member, said fluid motor means being laterally offset from said coupling means for turning the vehicle in one direction on being extended and for turning the vehicle in another direction on being retracted, and steering wheel means mounted on said front chassis for controlling said fluid motor means.

12. A hydraulically driven articulated vehicle as set forth in claim 11, further comprising driver seat means mounted on said front chassis behind said steering wheel means.

13. A hydraulically driven articulated vehicle as set forth in claim 12, further comprising material handling means mounted on said front chassis for pivotal movement above a transverse axis in a plane coincidental with said vertical and horizontal axis of said coupling means.

14. An articulated motor vehicle comprising, in combination, first frame means, second frame means pivotally connected to said first frame means, an internal combustion engine mounted on one of said frame means, first wheel means supporting said first frame means, second wheel means supporting said second frame means, transmission means carried by one of said frame means, hydraulic pump means driven by said internal combustion engine means and mounted on one of said frame means, hydraulic motor means driven by hydraulic fluid from said pump means and mounted on one of said frame means, said hydraulic motor means connected to and driving said transmission means, first differential means and first axle means connected to said first wheel means and driving the same, second differential means and second axle means connected to said second wheel means and driving the same, first drive shaft means drivingly connecting said first differential means to said transmission means, and second drive shaft means connecting said second differential means to said transmission means.

15. An articulated motor vehicle comprising, in combination, first wheel means, second wheel means, first differential and axle means drivingly connected to and supporting said first wheel means, second differential and axle means drivingly connected to and supporting said second wheel means, first frame means carried by said first wheel means, second frame means carried by said second wheel means and pivotally connected to said first frame means, transmission means driven by hydraulic motor means carried by said first frame means, first drive shaft means connecting said first differential means to said transmission means, and second drive shaft means connecting said second differential means to said transmission means.

16. A motor vehicle comprising, in combination, first frame means, second frame means connected to said first frame means for movement about both a vertical axis and an horizontal axis extending longitudinally of the vehicle, an internal combustion engine mounted on said second frame means, a first pair of laterally disposed wheels supporting said first frame means, a second pair of laterally disposed wheels supporting said second frame means, and hydraulic motor means driven by said engine and carried by said first frame means drivingly connected to said first pair of wheels and drivingly and pivotally connected to said second pair of wheels to accommodate pivoting of the vehicle about said vertical axis.

17. A hydraulically driven articulated vehicle comprising, in combination, front chassis means, rear chassis means pivotally connected to said front chassis means, hydraulic motor means mounted only on one of said chassis means for driving the same, and mechanical drive shaft means extending from said hydraulic motor means to the other of said chassis means for driving the same.

18. A hydraulically driven articulated vehicle as set forth in claim 17, further comprising, powering means mounted only on one of said chassis means for driving said hydraulic motor means.

19. A hydraulically driven articulated vehicle as set forth in claim 18, wherein said powering means comprises an hydraulic pump driven by an internal combustion engine.

20. In a vehicle comprising, in combination, front chassis means having wheels, rear chassis means having wheels, coupling means pivotally connecting said rear chassis means to said front chassis means, and hydraulic motor means mounted only on one of said chassis means for driving all of said wheels.

21. In a vehicle as set forth in claim 20, fluid motor means laterally offset from said coupling means and pivotally connected at one end thereof to said front chassis means and pivotally connected at the other end thereof to said rear chassis means for skewing said front and rear chassis means relative to each and controlling the direction of travel of the vehicle.

22. In a vehicle as set forth in claim 20, drive shaft means driven by said hydraulic motor means and driving said wheels of the other of said chassis means.

23. In a vehicle as set forth in claim 22, wherein said drive shaft means are disposed in a plane below said coupling means.

24. A motor vehicle comprising, in combination, first wheel means, second wheel means, first differential and axle means drivingly connected to and supporting said first wheel means, second differential and axle means drivingly connected to and supporting said second wheel means, first frame means carried by said first wheel means, second frame means carried by said second wheel means, transmission means carried by said first frame means, hydraulic motor means drivingly connected to said transmission means, hydraulic pump means supplying hydraulic fluid to drive said hydraulic motor means, first drive shaft means connecting said first differential means to said transmission means, and second drive shaft means having a universal joint therein connecting said second differential means to said transmission means, and said first and second frame means being disposed above said first and second drive shaft means.

25. A hydraulically driven articulated vehicle comprising, in combination, front chassis means, rear chassis means pivotally connected to said front chassis means, hydraulic motor means mounted on said front chassis means for driving the same, powering means mounted on said rear chassis means for driving said hydraulic motor means, and mechanical drive shaft means extending from said hydraulic motor means to the other of said chassis means for driving the same.

References Cited

UNITED STATES PATENTS

| | | |
|---|---|---|
| 2,835,397 | 5/1958 | Wagner. |
| 3,049,186 | 8/1962 | Garrett _____ 180—51 |
| 3,167,147 | 1/1965 | Symons et al. _____ 180—51 |
| 3,237,790 | 3/1966 | Kampert et al. _____ 180—51 X |
| 3,342,282 | 9/1967 | Forpahl _____ 180—51 |

FOREIGN PATENTS

| | | |
|---|---|---|
| 902,349 | 12/1944 | France. |
| 1,125,283 | 7/1956 | France. |
| 234,376 | 6/1961 | Australia. |

A. HARRY LEVY, Primary Examiner

U.S. Cl. X.R.

180—66; 214—176